(12) United States Patent
Jessup

(10) Patent No.: US 7,527,292 B2
(45) Date of Patent: May 5, 2009

(54) TETHERED THROAT LINER FOR SIDE CURTAIN AIR BAG

(75) Inventor: Andrew Jessup, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 122 days.

(21) Appl. No.: 11/746,926

(22) Filed: May 10, 2007

(65) Prior Publication Data

US 2008/0277913 A1 Nov. 13, 2008

(51) Int. Cl.
*B60R 21/16* (2006.01)
(52) U.S. Cl. .................................. 280/743.2
(58) Field of Classification Search .............. 280/730.2, 280/736, 737, 739, 740, 743.2
See application file for complete search history.

(56) References Cited

U.S. PATENT DOCUMENTS

| | | | |
|---|---|---|---|
| 5,246,250 A | 9/1993 | Wolanin et al. | |
| 5,280,953 A | 1/1994 | Wolanin et al. | |
| 5,364,125 A | 11/1994 | Brown et al. | |
| 5,762,367 A | 6/1998 | Wolanin | |
| 6,371,517 B1 | 4/2002 | Webber et al. | |
| 6,409,213 B2 | 6/2002 | Webber et al. | |
| 6,746,045 B2 | 6/2004 | Short et al. | |
| 6,918,613 B2 | 7/2005 | Short et al. | |
| 6,918,614 B2 | 7/2005 | Ryan | |
| 6,932,385 B2 | 8/2005 | Hawthorn et al. | |
| 6,959,945 B2 * | 11/2005 | Fischer et al. ............... | 280/739 |
| 6,991,258 B2 * | 1/2006 | Hawthorn et al. ........... | 280/742 |
| 7,083,191 B2 * | 8/2006 | Fischer ....................... | 280/739 |
| 2003/0155756 A1 * | 8/2003 | Hawthorn et al. ........... | 280/739 |
| 2007/0075537 A1 * | 4/2007 | Rust ........................... | 280/739 |

FOREIGN PATENT DOCUMENTS

JP 2008062728 A * 3/2008

* cited by examiner

*Primary Examiner*—Faye M. Fleming
(74) *Attorney, Agent, or Firm*—Rankin, Hill & Clark LLP; Mark E. Duell

(57) ABSTRACT

The present invention relates to a side curtain air bag safety device that protects a vehicle occupant from expansion of the air bag when the occupant is not in a desired position in the vehicle. The air bag includes an internal tether that is connected to a valve at the end of a throat liner within the bag. When the air bag expands and when the occupant is in a desired position, the tether extends fully and triggers the valve such that inflation gas is directed in a usual direction providing cushioning adjacent to the occupant. However, when the occupant is not in a desired position the tether cannot fully extend and as a result the expansion gas is directed in an alternate direction that does not apply as much force within the bag in an area near the occupant, thus preventing injury.

14 Claims, 2 Drawing Sheets

US 7,527,292 B2

TETHERED THROAT LINER FOR SIDE CURTAIN AIR BAG

BACKGROUND OF THE INVENTION

Side curtain air bags are a relatively modern vehicle improvement that significantly increases occupant safety. These air bags extend on the vehicle interior from a hidden location on the roofline downward, when inflated during a collision, to provide protection for a vehicle occupant. Side curtain air bags can improve safety significantly because they are often the only protection provided that is specific for side impact collision events or sideways movement of a vehicle occupant. A single air bag may cover, on one side of the vehicle, only the area where a front occupant is seated or both this area and the area where a rear occupant is seated.

Side curtain air bags typically have a larger inflated volume than other air bag devices in the vehicle. However, inflation of side curtain air bags must still be as instantaneous as possible. To achieve this goal, higher flow rate inflators and/or multiple inflators may be used. Additionally, distribution devices such a throat liners are used to optimally distribute the inflation gas along the length of the air bag so that inflation is fast and generally even. Typically, larger volumes of air are directed to areas farther from the inflator to compensate for the increased time required for gas to reach these areas.

Because side curtain air bags cannot inflate instantaneously, it is possible that the vehicle occupant, sliding laterally during a collision, could be located directly under the air bag as it expands downward from the roofline of the vehicle. The occupant could also be located in this position for other reasons. Either way, instead of being cushioned by the air bag, the occupant could be injured by the expanding air bag forcefully pushing on the top of his/her head. What is desired is a way to protect a occupant already located in an undesirable position when a side curtain airbag has not yet fully expanded into that position.

BRIEF SUMMARY OF THE INVENTION

The present invention relates to an air bag safety device that protects a vehicle occupant from downward expansion of the air bag when the occupant is not in a desired position in the vehicle. The air bag includes an internal tether that is connected to a valve. When the air bag expands and the occupant is in a desired position, the tether extends until becoming taut and triggers the valve such that inflation gas is directed in a usual direction into a chamber or chambers within the air bag adjacent to the desired position of the occupant. However, when the occupant is not in a desired position the tether cannot fully extend and as a result a larger volume of the expansion gas is directed in an alternate direction into an adjacent chamber not directly aligned with the occupant, which does not result in the generation of as much force within the bag chamber(s) in an area near the occupant. The invention is preferably installed within a side curtain air bag and the valve is at the distal end of a throat liner within the air bag (the throat liner's proximal end being near where an inflator attaches to the throat liner). In normal operation, inflation gas air passes through both the valve into the end of the air bag and aperture(s) in the bottom of the throat liner, but after closing the valve the gas passes only through the apertures in the bottom of the throat liner.

The air bag safety device requires only two chambers within the air bag, one adjacent to the occupant and one not generally adjacent to the occupant, but typically the air bag is divided into three or more chambers as illustrated in the figures. These and other aspects of the invention are herein described in particularized detail with reference to the accompanying figures.

DETAILED DESCRIPTION OF THE INVENTION

Figure 2:
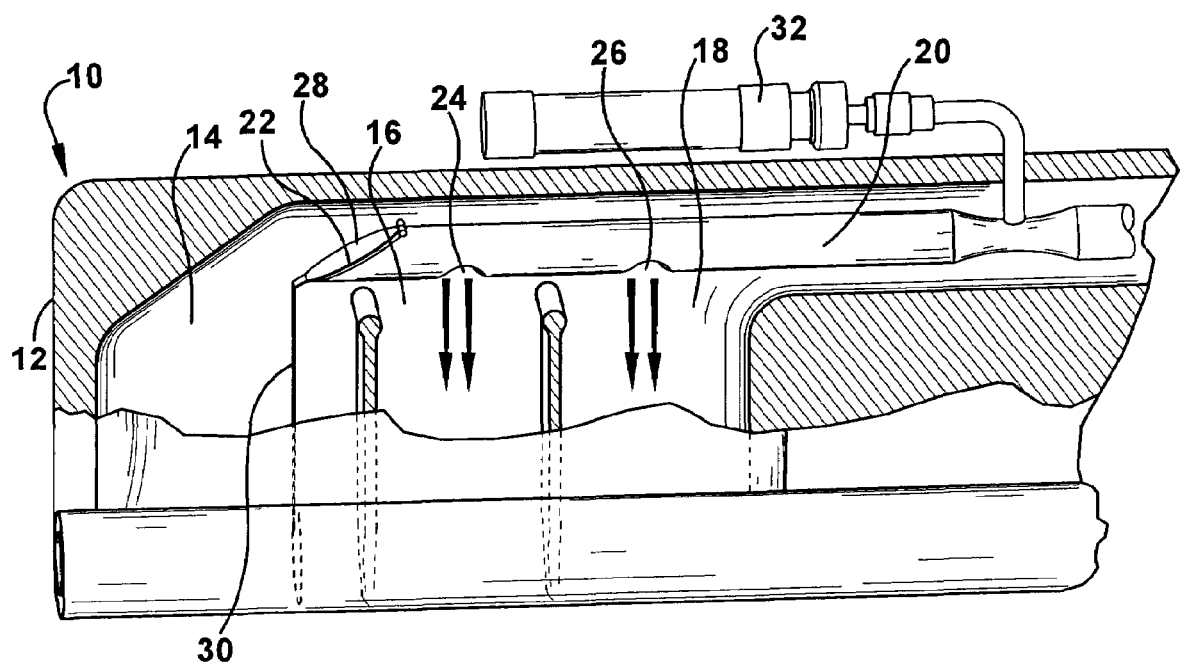
FIG. 2 is a side elevational view of the air bag system of the present invention in an partially (approximately two-thirds) expanded position when no occupant interference occurs.
Figure 3:
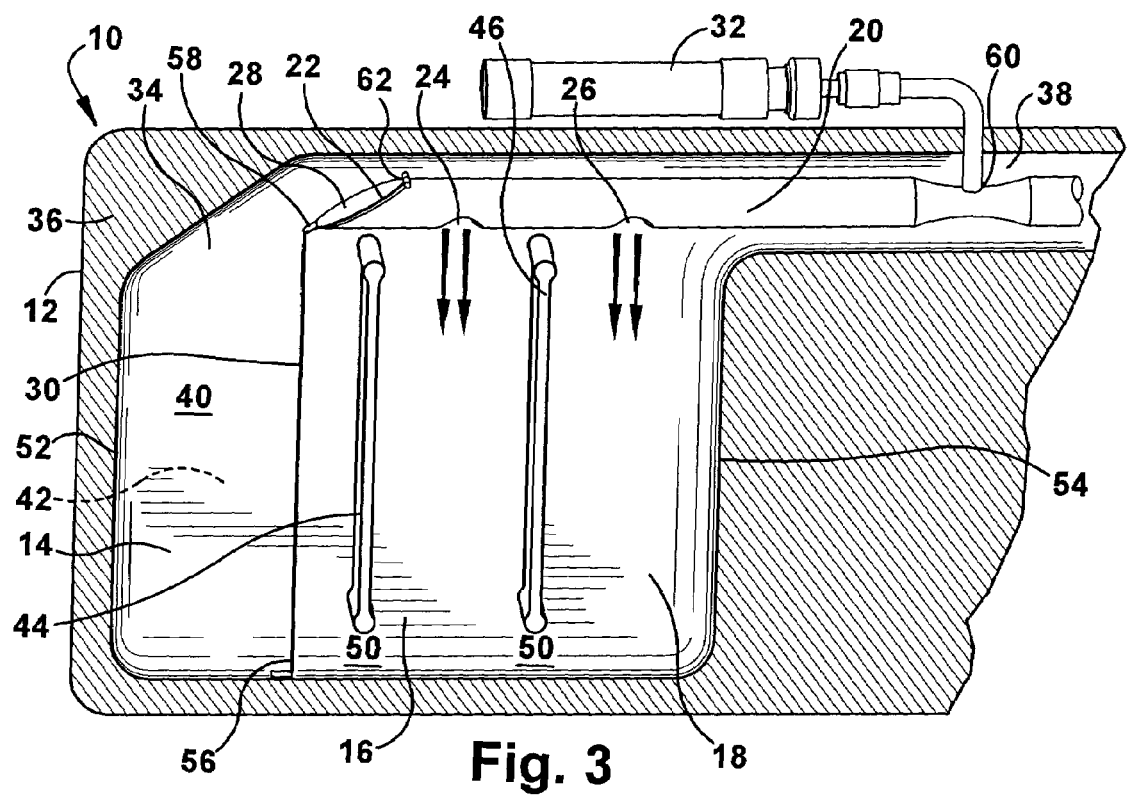
FIG. 3 is a side elevational view of the air bag system of the present invention in an expanded position when no occupant interference occurs.

Referring to the drawings, specifically FIGS. 2-3, a preferred side curtain air bag system 10 according to the present invention is illustrated. The air bag system 10, as described below, includes an air bag 12 divided into at least first and second chambers 14 and 16, a throat liner 20 including a plurality of apertures 22, 24, 26 through which inflation gas exits the throat liner 20, a valve 28, and a tether 30 that actuates the valve 28. The air bag system 10 is adapted to be placed in fluid communication with an inflator 32 that supplies inflation gas through the throat liner 20 into the air bag 12.

Referring to FIG. 3, the air bag 12 includes a gas receiving portion 34 and a border portion 36. Preferably, the perimeter of the gas receiving portion 34 is fully surrounded by the border portion 36. The border portion 36 of the air bag 12 has a thickness similar to the gas receiving portion 34 when the latter is not yet inflated. However, when the gas receiving portion 34 is inflated, the thickness of the gas receiving portion 34 increases significantly while the border portion 36 does not. The border portion 36 defines the rectangular shape of the air bag 12 when the air bag 12 is fully unrolled.

The air bag 12 preferably is formed from two walls 40 and 42 that are laminated together in some areas, but not in others. Within the border portion 36 of the air bag 12, the first wall 40 is laminated to the second wall 42. However, in the gas receiving portion 34 of the air bag 12, the first and second walls 40 and 42 are not laminated together and thus inflation gas is readily received therein.

The gas receiving portion 34 of the air bag 12 has a generally rectangular shape with an additional narrow throat 38 that extends from an upper and rearward edge toward a source of inflation gas 32. The gas receiving portion 34 is formed of at least the first wall 40 and the second wall 42. When the air bag 12 is installed on a vehicle and expanding, the first wall 40 is closest to the center of the vehicle passenger compartment and the second wall 42 is closest to the vehicle door(s). The throat 38 has a diameter greater than a throat liner 20 that is placed therein.

The rectangular part of the gas receiving portion 34 is divided at least into first and second chambers 14 and 16 (also referred to as cells), but preferably also includes a third chamber 18. The chambers 14, 16 and 18 are defined in part by partitions 44 and 46 that run vertically with regard to the orientation of the air bag 12 when installed in a vehicle. Each partition is secured along one lengthwise edge to the first wall 40 of the gas receiving portion 34 and on a second, opposite lengthwise edge to the second wall 42 of the gas receiving portion 34. Preferably, the partitions 44 and 46 are laminated to the walls 40 and 42 of the air bag 12.

In a preferred embodiment of the invention, the partitions 44 and 46 do not extend all the way to a top edge or a bottom edge of the gas receiving portion 34 of the bag 12. Thus, gas can move between the chambers via gaps 50 near the top of the gas receiving portion 34 at any time when the air bag 12 is being filled and via gaps 50 at the bottom of the gas receiving portion 34 only when the bag 12 is almost completely filled.

The first chamber 14, defined in part by a first partition 44, is located between a distal edge 52 of the gas receiving portion 34 of the air bag 12 and the first partition 44. The second chamber 16 is located between the first partition 44 and an adjacent second partition 46. The third chamber 18 is located between the second partition 46 and the proximal edge 54 of the gas receiving portion of the air bag 12.

A tether 30 is also located within the gas receiving portion 34 of the air bag 12. The tether 30 is a cord that is used to actuate the valve 28. The tether 30 is attached at a first end 56 on or near the bottom edge of the gas receiving portion 34 of the air bag. The tether 30 is attached at a second, opposite end 58 to the valve 28.

The throat liner 20 is a cloth tube attached, preferably by sewing, to the air bag 12 at the distal end of the throat liner 20. The throat liner 20 includes a plurality of apertures 22, 24, 26 placed therein. The throat liner 20 fits within the gas receiving portion 34 of the air bag 12, in the throat 38 and extends into the rectangular portion. The throat liner 20 extends from a connection point 60 with the inflator in a forward direction to a point above the first chamber 14 of the gas receiving 34 portion of the air bag 12. The throat liner 20 also extends in a rearward direction from the connection point 60 with the inflator 32 if the air bag 12 has a portion for protecting occupants in the rear seat.

The valve 28 is attached to the throat liner 20 at its distal end 62. The valve 28 is any type of valve that may be actuated by a cord. The valve 28, when closed, prevents the flow of gas out of the distal end 62 of the throat liner 20. Alternatively, the valve 28 may be partially, but not fully closed by the actuation of the tether 30, thus reducing, but not eliminating flow through the distal end 62 of the throat liner 20. The throat liner 20 has a first aperture 22 at it distal end 62 through which the gas passes. Preferably, the throat liner 20 includes additional apertures 24, 26 on its bottom side. One aperture 24 is located above the second chamber 16 and another aperture 26 is located above the third chamber 18. Preferably, the apertures are round, but may be other shapes as well.

Figure 1:
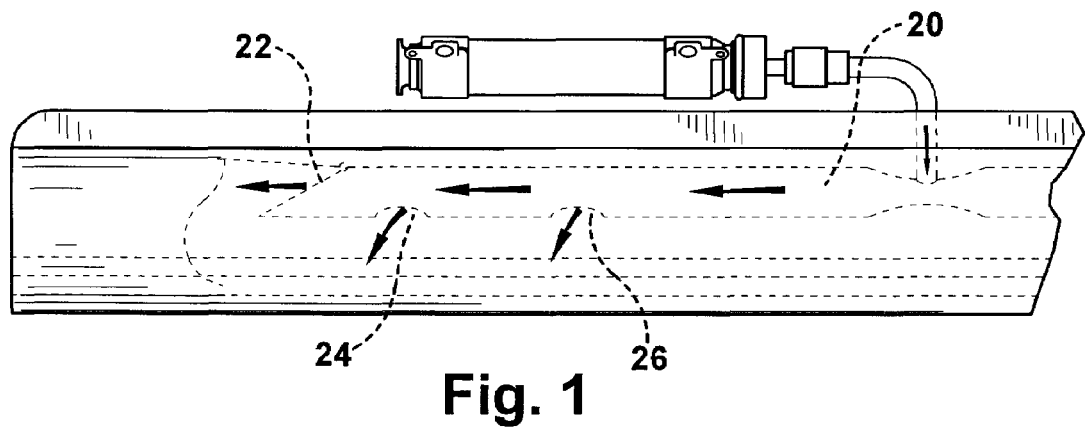
FIG. 1 is a side elevational view of an air bag system of the present invention with the air bag beginning to deploy.

Referring to FIGS. 1-3, operation of the side curtain air bag system 10 is shown when the vehicle occupant is in a desired, safe position. Extreme motion of the vehicle or another trigger known in the art triggers the air bag system 10 and actuates an inflator 32. Inflating gas is discharged from the inflator 32 into the throat liner 20. As seen in FIG. 1, gas passes through the throat liner 20 and exits from apertures 22, 24 and 26. The first aperture 22 is at the end of the throat liner 20 and second and third apertures 24, 26 are on the bottom side of the throat liner 20. Approximately, the same amount of inflating gas exits from each aperture on the throat liner. As seen in FIG. 2, the tether 30 becomes taut when the air bag 12 is approximately ninety percent of the way unrolled. At this time, tension in the tether 30 pulls on the valve 28 causing it to close partially or fully. Thus, more inflating gas is directed to the second and third apertures 24, 26 of the throat liner 20. As a result, the second and third chambers 16 and 18 of the expansion part 34 of the air bag 12 expand faster. As the air bag 12 unrolls to its full extent the tether 30 stretches slightly.

Figure 4:
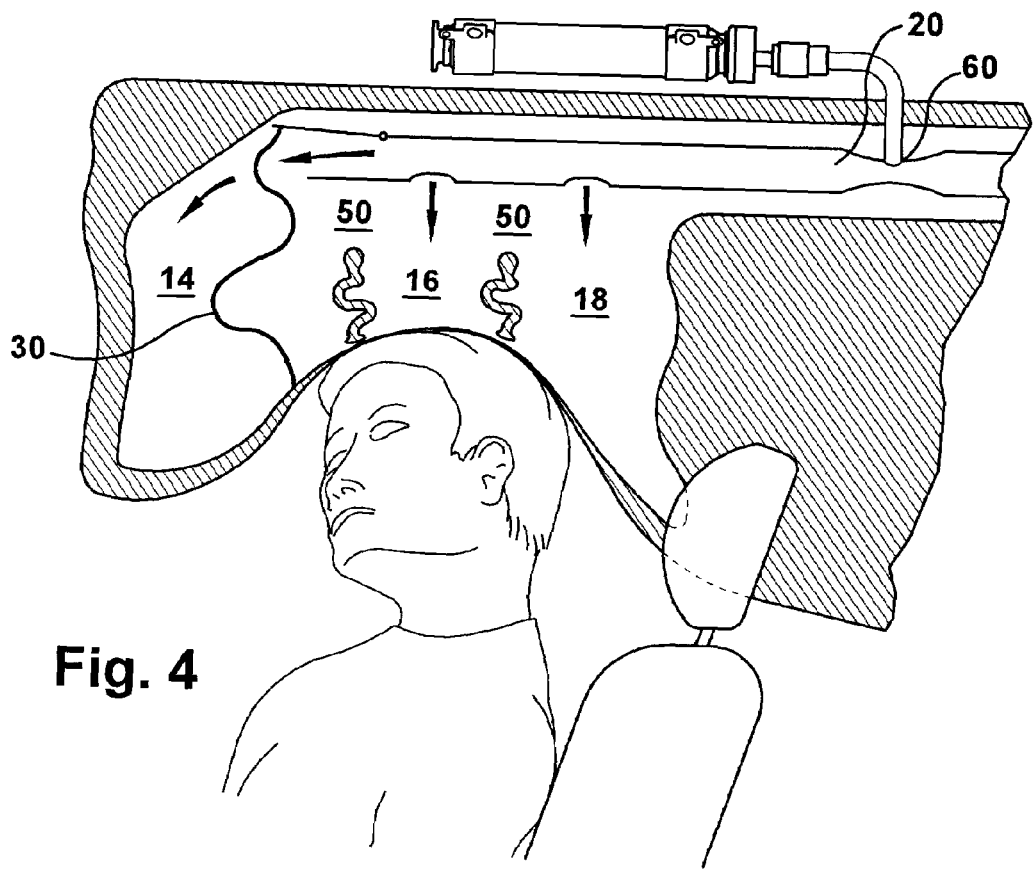
FIG. 4 is a side elevational view of the air bag system of the present invention in an expanded position when occupant interference occurs.

In an alternate inflation scenario illustrated in FIGS. 1 and 4, the occupants head is not in a safe position, but is instead close to the vehicle door and in the path of the expanding air bag 12. The air bag 12 begins unrolling in a manner identical to the prior scenario as shown in FIG. 1. However, the air bag 12 is unable to unroll into a position where the tether 30 is made taut. Instead, when the air bag 12 unrolls approximately half way, the top of the air bag 12 contact the occupants head. Thus, the valve 28 remains open and gas continues to be expelled into the first chamber 14, as well as the second 16 and third 18 chambers. As a result, less force is applied to the occupant's head than in the first scenario described. Additionally, instead of forcing the second and third chambers 16 and 18 to further expand, inflation gas moves through the gaps 50 between the partitions 44 and 46 and the throat liner 20 from the second and third apertures 24, 26 into the first chamber 14. This also prevents a significant amount of force is not applied to the occupant's head.

The present invention provides a significant advantages over the prior art because extreme forces are not applied to a vehicle occupant's head during side curtain air bag inflation when the occupant is located in an undesired location that is close to the vehicle door. Further, the present invention uses a simple tether and valve system, optionally along with the special placement of partitions to achieve desired gas distribution when the occupant is in this position. No complex electronics or sensors are required to determine the occupant's position.

As opposed to having two apertures on the bottom of the throat liner, as illustrated, only one or more than two apertures may be used. In conjunction with changing the number of apertures on the throat liner, the number of chambers within the gas expansion portion of the air bag may be increased or decreased. The shape of the side curtain air bag may also be changed and/or the shape and size of just the border portion or expansion portion.

The length of the partitions may be varied, thus changing the size of the gaps between the chambers. These changes are based on testing and tuning to provide optimal gas flow within the expanding air bag. The partitions may be so long on its bottom as to reach the bottom edge of the gas receiving portion of the air bag. The partition may be so long on its top so as to reach the lower edge of the throat liner.

The throat liner may extend to a rear air bag that protects occupant's in the rear seat of the vehicle. The structure of the air bag rear portion is similar to the front portion.

Although the invention has been shown and described with reference to certain preferred and alternate embodiments, the invention is not limited to these specific embodiments. Minor variations and insubstantial differences in the various combinations of materials and methods of application may occur to those of ordinary skill in the art while remaining within the scope of the invention as claimed and equivalents.

What is claimed is:

1. A side curtain air bag system comprising:
   a bag portion including at least a first gas receiving chamber and a second gas receiving chamber;
   a throat liner for distributing inflation gas within the bag portion, the throat liner being fluidly connectable to an inflator and including a plurality of apertures for discharging inflation gas;
   a valve on the throat liner for selectively closing one of the apertures of the throat liner; and
   a tether attached to the bag portion and operably connected to the valve;
   whereby during deployment of the side curtain air bag, when the bag portion unrolls to a predetermined position, the tether actuates the valve such that the ratio of gas distribution between the first gas receiving chamber and second gas receiving chamber changes.

2. The side curtain air bag system of claim 1, wherein the aperture closed by the valve is located at a distal end of the throat liner opposite a proximal end that is fluidly connectable to an inflator.

3. The side curtain air bag system of claim 1, wherein a first aperture on the throat liner is located at the distal end of the throat liner and is located above the first chamber and a second aperture on the throat liner is located above the second chamber.

4. The side curtain air bag system of claim 1, wherein the tether closes the valve when the air bag is approximately ninety percent unrolled.

5. The side curtain air bag system of claim 1, wherein the first and second gas receiving chambers are defined at least in part by a partition that extends between a first wall and a second wall of the bag portion.

6. The side curtain air bag system of claim 5, wherein gaps are present between each partition and the top edge of the bag portion and gaps are present between each partition and the bottom edge of the bag portion.

7. The side curtain air bag system of claim 1, wherein the bag portion includes a third gas receiving chamber.

8. The side curtain air bag system of claim 1, the plurality of apertures of the throat liner include a first aperture at a distal end of the throat liner and second and third apertures on the bottom side of the throat liner.

9. The side curtain air bag system of claim 1, wherein the bag portion includes a gas receiving portion and a border portion.

10. The side curtain air bag system of claim 1, wherein the tether is made taut to close the valve on the throat liner.

11. The side curtain air bag system of claim 1, further including an inflator in fluid communication with the throat liner.

12. The side curtain air bag system of claim 5, wherein the partition extends to a bottom edge of the first and second gas receiving chambers.

13. The side curtain air bag system of claim 5, wherein the partition extends to the bottom of the throat liner.

14. A method of inflating a side curtain air bag comprising the steps of:
providing:
- a bag portion including at least a first gas receiving chamber and a second gas receiving chamber;
- a throat liner within the bag portion, the throat liner being fluidly connectable to an inflator and including a plurality of apertures for discharging inflation gas;
- a valve on the throat liner for selectively closing one of the apertures of the throat liner; and
- a tether attached to the bag portion and operably connected to the valve;

adding an inflation gas to the throat liner such that when the gas is discharged from the throat liner the bag portion, initially provided in a rolled form, begins to unroll;

adding additional inflation gas to the throat liner such that the air bag portion continues to unroll causing the tether to close the valve.

* * * * *